United States Patent Office 2,876,903
Patented Mar. 10, 1959

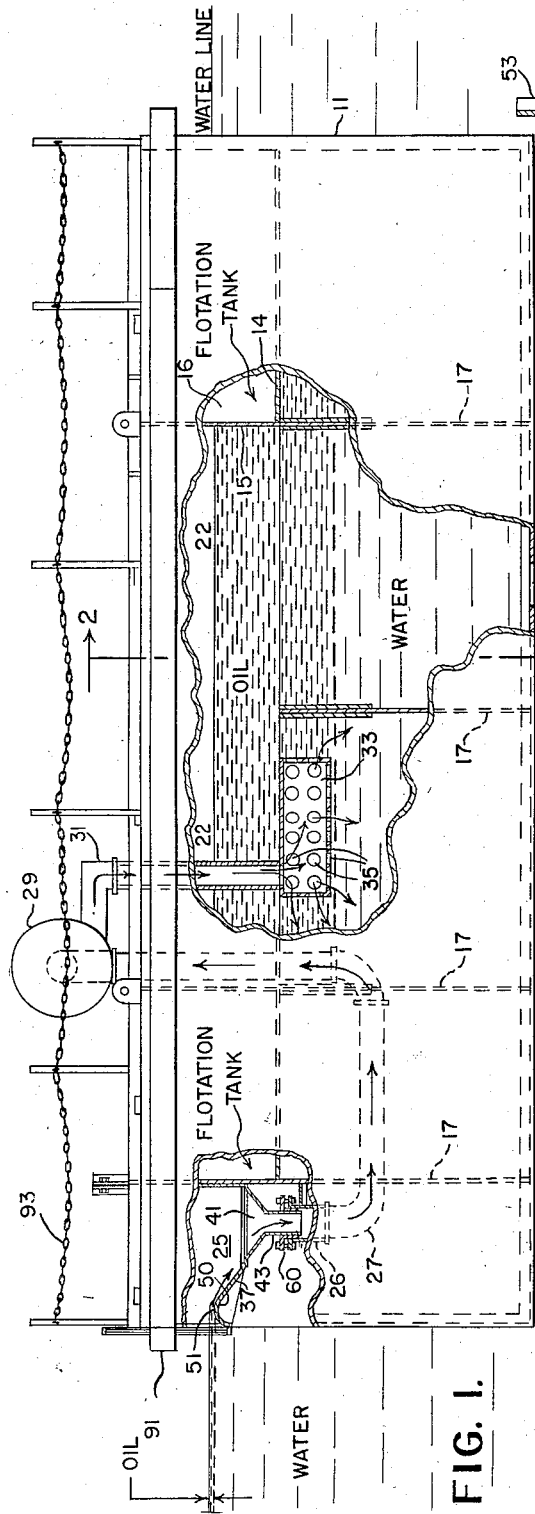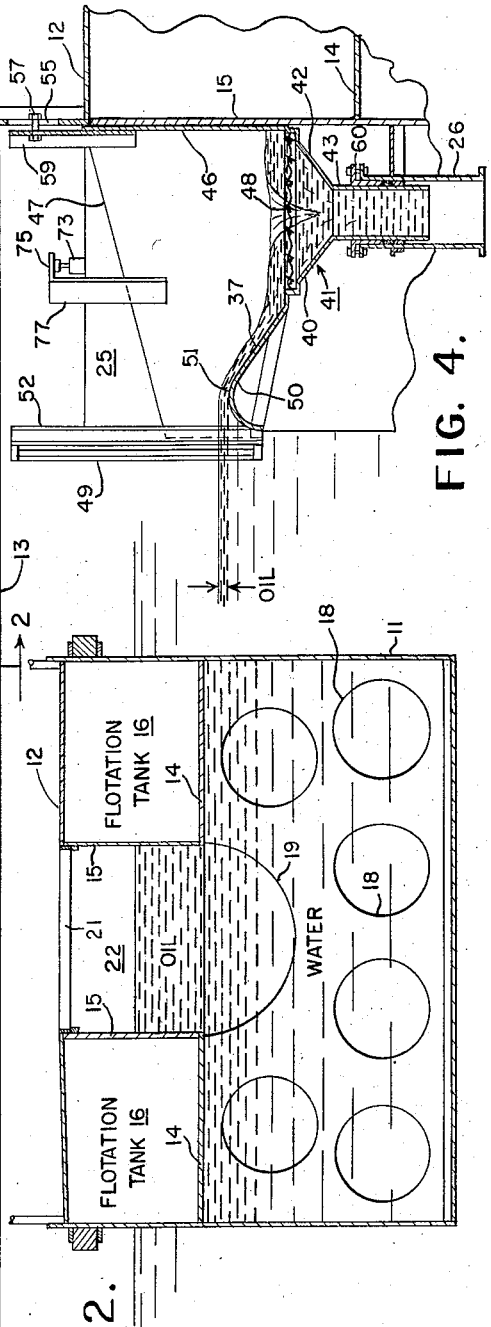

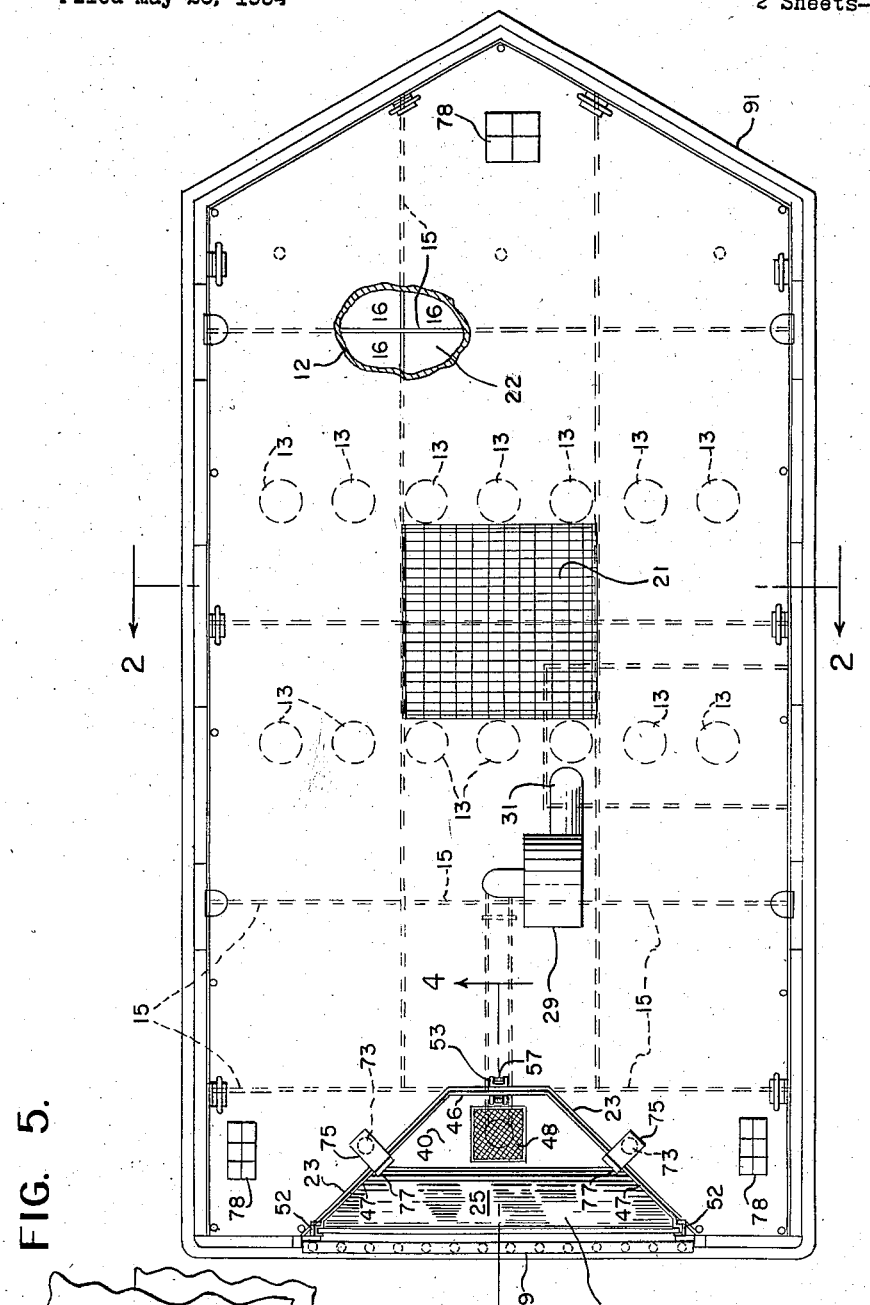

2,876,903

OIL SKIMMER AND SEPARATOR VESSEL

Harry W. Lee, Portsmouth, Va.

Application May 26, 1954, Serial No. 432,624

15 Claims. (Cl. 210—242)

(Granted under Title 35, U. S. Code (1952), sec. 266)

The invention described herein may be manufactured and used by or for the Government of the United States of America for governmental purposes without the payment of any royalties thereon or therefor.

The present invention relates to an oil skimmer and separator which is specifically designed for quickly and effectively removing oil slicks from bodies of water and especially from locations such as harbor areas where oil slicks are both nuisances and dangerous; but the invention also has broader aspects.

The presence of waste oil on navigable and other water has long been a problem. It constitutes a serious fire hazard as well as a general pollution nuisance. Previous attempts have been made to remove such oil slicks. One method which has been used is the distribution of carbonized sand to cause the slick to sink. This method is both slow and expensive. Attempts have also been made to remove the oil by directing its flow by means of streams from hoses to a point where the tide will remove it. This method is also slow, and is uncertain in operation. Skimmers, separators and vacuum pickup systems have been devised but none of these systems has been fully satisfactory.

Generally this invention relates to an apparatus for efficiently reclaiming oil floating on the surface of navigable and other waters. The efficicency of reclamation is due in part to the utilization of flotation tanks and perforated bulkheads in a barge such that a substantially constant freeboard is maintained, thereby enabling a novel skimmer apparatus to be built integral with the barge. This latter feature allows a fine adjustment of the skimmer to a proper depth. Further the skimmer is designed such that in cooperation with a suction pump, a whirlpool effect is created therein and the oil layer is sucked into the stationary barge as an unbroken sheet with a minimum amount of water. The velocity of the sucked in mixture is reduced by a diffusion element enabling the oil and water in the now slowly moving mixture to separate more expeditiously; the water escaping through an opening in the bottom of the barge and the oil remaining in the barge.

It is an object of the present invention to provide a vessel which is designed especially for skimming oily layers from surface waters, separating the oil and water, and storing the oil so that a large area can be cleaned and the oil separated out before the vessel has to be moved to unload the skimmed off oil.

It is a further object of the invention to provide an oil removal apparatus by means of which the oil is recovered from oily mixtures and made available for use.

Another object of the invention is to skim oil from a body of water with a minimum of water mixed with the skimmed-off oil.

A still further object of the invention is the provision of an improved type of skimmer mechanism for the removal of oil slicks which utilizes the physical properties of the oil and water to achieve effective separation of the oil from the water.

Another object of the invention is the provision of an oil skimmer which takes advantage of the surface tension of the oil slick to promote quick, thorough and efficient removal of oil from the surface of the water at a low cost.

It is also an object of the invention to provide a skimmer barge assembly which includes skimming, separating and storage facilities in a single compact unit.

Other objects of many of the attendant advantages of this invention will be readily apparent as the same becomes better understood by reference to the following detailed description when considered in connection with the accompanying drawings wherein:

Figure 1 is side elevational view, generally to scale except for small dimensioned parts, of an apparatus constructed in accordance with the principles of the invention, but having portions thereof broken away and sectioned to more clearly show parts of the mechanism thereof;

Figure 2 is a vertical sectional view of the apparatus of Figure 1, taken along the section line 2—2 and similarly generally to scale;

Figure 3 is a plan view, with parts broken away, of the apparatus of Figure 1;

Figure 4 is an enlarged detailed sectional view along the line 4—4 of Figure 3 of the improved skimmer mechanism used in the apparatus of Figure 1; and Figure 5 is an enlarged view of a packing gland arrangement used in the apparatus.

The apparatus as constructed in accordance with the principles of the invention is an improved skimmer barge which combines the functions of oil-skimming, separation and storage into a single unitary assembly.

Referring particularly to Figures 1 and 3, the particular skimmer barge herein shown consists of a box-type steel structure comprising hull structure 11 and a deck 12. The hull 11 has a pair of rows of holes 13 centrally in the bottom thereof to permit relatively free passage of water therethrough. The hull 11 is provided with plating 14 from which bulkheads 15 extend upwardly. Plating 14, bulkheads 15 and hull 11 provide a plurality of watertight flotation tanks or chambers 16 occupying substantially the entire top part of the ship except for portions that will be described subsequently. The tanks 16 are of sufficient size to permit the desired amount of freeboard of the barge to be maintained. The flotation tanks can be provided with drain holes closed by removable plugs or with other closeable openings. The barge also has lower vertical baffle or swash plates 17 (see Figure 2) to limit turbulence of liquid in the lower part of the hull structure. Each plate 17 is provided with a plurality of large holes 18 and several have enlarged upper openings 19. The plates 17 can be extensions of the bulkheads 15.

The deck 12 has a centrally located opening therein covered by a removable grating 21 which may be spaced flooring bars. It will be noted that no flotation tanks are located under this grating. A rectangular compartment 22 is formed centrally of the barge, below the grating, and is similar in effect to a standpipe. This compartment 22 is in open communication with the lower liquid holding part of the ship below plating 14.

As shown at the extreme left hand side of Figures 1 and 3, the hull structure 11 is provided with upright walls forming a generally trapezoidal shaped portion or indentation 23, which extends substantially for the full height of the hull 11 and has its long base open. This portion 23 serves to house the improved skimmer mechanism generally designated at 25. The mechanism 25 comprises a cylindrical outlet pipe 26 to which is connected a suction means comprising a pipe 27 leading to the intake side of a centrifugal pump 29 mounted on the deck 12. The outlet of the pump 29 is connected through a discharge pipe 31 to a diffusion box 33. The diffusion box 33 is located inside the hull structure 11 at a level immediately below that of the flotation chambers 15. The diffusion box 33 as shown has a single large inlet connected to the end of the discharge pipe 31 and a plurality of small outlets illustrated by the small ports visible in Figure 1. The diffusion box breaks up or disperses the discharge stream from the pump 29.

The skimmer mechanism 25 of the assembly will now be described. The structure of this element is best illustrated in the detailed sectional view of Figure 4 and in Figures 3 and 5. In general plan outline, the skimmer 25 is trapezoidal in shape to adapt it to slidably fit the similarly shaped portion 23 in the hull structure 11.

The skimmer mechanism 25 comprises an apron structure 37 which is generally trapezoidal in plan outline. The apron 37 has a long base that is adjacent the long base of the compartment portion 23 of the hull; and the apron extends inward about half way to the short base of the trapezoidal portion 23 where the apron merges into a funnel portion comprising a wall 40 and a funnel 41 having a circular mouth 42 and a depending discharge pipe 43. The skimmer has a vertical back wall 46, and has upstanding side walls 47 that extend upwardly from associated lateral walls of the funnel portion and apron 37 to form a tight scoop-like sump. The side walls 47 extend forwardly to the front edge approximately in line with the large base edge of the apron 37. The apron 37 and the wall 40 of the funnel portion form a bottom for the sump, the bottom being closed except for the funnel mouth 42 at its lowest point.

An intake filter screen 48 is placed over the funnel of the skimmer apron to prevent the entry of debris into the section or intake pipe 27. A further screening member 49 for stopping the entry of debris also may be provided to extend vertically across the entrance to the skimmer mechanism, this screening member being secured, if desired, to certain guide rails, later described.

The apron 37 has a curved upper or weir portion 50 along its long base, this weir portion being substantially in the face of the end of the barge. The upper edge of the weir portion 50 has a smooth unbroken transversely curved surface. This surface has a topmost portion or ridge 51 that parallels the long base of the apron but is a short distance backward from the base in the direction of the short base or back wall 46. The ridge 51 extends to and between the side walls 47.

The apron 37 is shaped as shown in Figure 4. An indication of the size of the skimmer mechanism can be gathered from a specific construction wherein the front large base of the compartment portion 23 of the hull was eight feet, ten inches, and the height of the weir 50 above its bottom front edge or large base was 4 inches.

The skimmer mechanism 25, comprising the apron 37, the wall 40, the funnel 41 and the walls 46 and 47, is arranged for vertical adjustment in the compartment portion 23 of the hull. To this end the hull has fixed thereto a pair of vertical guide rails 52 near the front corners of apron 37 of the skimmer mechanism, and has fixed thereto a channel bar forming an anchor post 53 about at the center of the back base of the compartment portion 23 of the hull. The post 53 has a vertical slot 55 slidably receiving a clamping member such as a bolt and nut means 57.

The skimmer member 25 is provided with any suitable cooperative guide means, such as lugs or rollers, that ride in guide rails 52, and is provided with an upright bar 59 receiving the bolt of the bolt and nut means 57 by means of which the skimmer mechanism is tightened in place after suitable vertical adjustment.

To accommodate vertical adjustment without leakage between the movable discharge pipe 43 of the funnel 41 and the fixed outlet pipe 26, which is an inlet to the suction means, any suitable packing gland arrangement 60 can be provided. This gland is shown in simplified form in Figures 1 and 4; but Figure 5 illustrates such a gland.

The movable funnel pipe 43 is concentric with the fixed pipe 26 but spaced inwardly therefrom. A short tubular member 61 is in the space, having the flange 63 above a flange 65 welded to the top of pipe 26. The pipe 26 also has welded thereto an inner ring 67, the ring being spaced from the bottom of the tubular member 61. The facing surfaces of the ring 67 and member 61 are flared, and packing material 69 is placed therebetween. After the skimmer mechanism is adjusted, the packing 69 is tightened by obvious operations on a plurality of spaced bolt and nut means 71 engaging the flanges 63 and 65. The gland should be substantially watertight, but should not be so tight as to prevent adjustment or sliding movement of the pipe 43.

The skimmer can be vertically adjusted through raising and lowering means in the form of a pair of jacks 73 that are carried by the hull 11. As better shown in Figures 3 and 4, each jack engages an ear 75 mounted upon uprights 77 that extend from and are secured to approximately the midpoints of the vertical sidewalls 47 of the skimmer mechanism. The skimmer is adjusted vertically by loosening the clamping bolt 57, and operating the jacks 73 to raise or lower the skimmer with respect to the hull. The skimmer structure slides within the guide rails 52 and is prevented by them from moving in any direction other than the vertical. When the proper operating position has been obtained the clamping bolt 57 may be tightened to maintain the skimmer structure at the selected operating height. A plurality of loose weights 78 on the deck 12 can be shifted around on the deck for minor adjustments in height and trim of the barge and hence of the skimmer apparatus. The proper manner of making the skimmer adjustment will be more fully set forth hereinafter.

The operation of the skimmer-barge assembly will now be described. The flotation tanks or chambers 16 cause the barge to float in the water with a substantially constant freeboard. It has been therefore found advantageous to mount the skimmer device directly upon the hull itself. The skimmer mechanism 25 is carefully adjusted in vertical position by raising or lowering it with respect to the hull structure 11 which supports it. As has been pointed out the skimmer structure is slidably adjustable vertically in the guide rails 52 mounted on the hull 11; and jacks 73 are used to set its position relative to the hull. Due to the substantially constant freeboard of the hull, this, for all intents and purposes, amounts to an adjustment of the skimmer 25 with respect to the surface of the water and the oil layer or slick floating thereon. If desired, any part of the weights 78 on the deck 12 can also be moved for adjustment of the skimmer. Actually, the position of the ridge 51 of the curved or weir portion 50 of the skimmer should be placed beneath the surface approximately at the interface between the oil and water layers. An adjusted operable position of the skimmer barge is shown in Figure 1 in which the thickness of the oil film or slick is exaggerated for the purposes of illustration. The upper or weir ridge 51 is preferably placed just slightly below the interface between the oil and the water.

With the pump 29 operating, oil, along with a certain amount of water, flows over the weir 50 and flows smoothly in an unbroken sheet over the apron structure 37 toward the rear or apex of the trapezoidal structure and into the funnel 41. The mixed oil and water sheet enters the suction intake pipe 27 and is drawn through the pipe by the action of the centrifugal pump 29. The apron surface 37, the vertical back wall 46 and the vertical side walls 47 form a sump, from which the liquid is drawn by the pump. A suitable adjustment of the skimmer can be judged from the level of the oil and water in the sump during skimming operation, and the formation of a vortex at the mouth of the funnel. For the specific embodiment already mentioned, the skimmer height is adjusted so that the water level maintained in the sump is approximately two and one half inches below the exterior water level.

The action of the pump 29 creates a suction vortex at the sump water level and the unbroken sheet of oil and water flowing smoothly downwardly over the surface of the apron 37 is pulled into this vortex. Due to the surface tension of the oil layer the suction effect of the pump extends through the unbroken sheet or layer of oil up over the apron 37 and out over the weir 50 to the oil layer floating on the water surface outside the skimmer. The surface oil is thus forcibly drawn in from outside and the barge may remain in a stationary position while skimming a relatively large area. If desired, however, the exterior oil film may be assisted in its progress toward the skimmer barge by the use of streams of water as from hoses or by the use of the propellors of an accompanying work boat.

The oil and water discharged by the centrifugal pump 29 passes through the discharge pipe 31 to the diffusion box 33. The diffusion box serves to disperse the output stream from the discharge pipe 31 and to break it up into a number of smaller streams which emerge at a low velocity from the box through the outlet ports 35 in the sides of the box. The liquids separate within the hull structure 11 by gravity process. The oil rises to the top as shown in Figure 1. Oil in the standpipe 22 will reach a height substantially that of the outside liquid level with due allowances for different densities. The heavier water settles to the bottom, and is displaced and passes out of the barge through the holes 13 in the bottom of the hull structure as the oil accumulates. The oil is retained within the hull and the skimming operation may be continued until the entire hull structure is substantially completely filled with oil. The hull may be towed to any convenient point and the oil stored therein pumped out. The grating 21, centrally located in the deck 12, may be removed to allow access to the oil for the purpose of removal. The accumulated oil may then be reclaimed for further use.

The hull structure of the skimmer barge may be used only for gravity separation of oil and water mixtures if desired. This feature has been found useful when pumping oil-contaminated water ballast from ships. The mixture is pumped directly into the hull 11 and allowed to separate therein by the gravity process described above. The pump and the skimmer apparatus do not function when the apparatus is used for this purpose.

The barge may have conventional expedients for practicability, such as for example, a bumper guard 91 and hand-chains 93.

Obviously many modifications and variations of the present invention are possible in the light of the above teachings. It is therefore to be understood that within the scope of the appended claims the invention may be practiced otherwise than as specifically described.

What is claimed is:

1. A skimmer barge assembly comprising a hull section having a partially open bottom structure to permit circulation of liquid therethrough, a plurality of sealed flotation tanks mounted within said hull section to cause said hull section to have a substantially constant freeboard when placed in a body of liquid, a skimmer apparatus mounted on said hull section and vertically adjustable with respect thereto, said skimmer apparatus comprising a sump having a weir along one side thereof with a transversely rounded edge, and on its other side being secured directly to an end of said hull, a smooth apron surface sloping downwardly from said weir toward the bottom of said sump, a downwardly extending discharge at the lower portion of said sump, a pump having an inlet connected to said discharge, a diffusion box mounted within said hull below said flotation tanks and above the bottom of said hull, an oil-receiving chamber over said diffusion box, said diffusion box having holes in its sides, and discharge means connecting the outlet of said pump to said diffusion box.

2. A skimmer barge assembly comprising a hull structure having a partially open end section, flotation means positioned within said hull structure whereby a constant freeboard is maintained, a vertically adjustable skimmer apparatus placed within said open end section, said skimmer comprising a weir having an upper edge with a transversely curved surface, a funnel-like portion located adjacent and a predetermined distance below said weir, a sloping surface forming a spillway between said weir and funnel-like portion, an inlet at the lowermost portion of said funnel-like portion, said inlet comprising a downwardly directed pipe means, a suction pump connected to said pipe means and discharge means connected to said pump leading to the interior of said hull structure for removing and maintaining the flow of a sheet of liquid down said spillway.

3. A skimmer barge assembly for separating liquids having different densities comprising a hollow raft-like structure, a plurality of flotation tanks mounted in the upper portions of said structure to enable it to float in said liquids, a plurality of perforated bulkheads separating the lower portions of said structure into water holding sections, an oil-holding chamber above said sections, said tanks and bulkheads causing said barge to maintain a substantially constant freeboard, a skimmer apparatus within an upper open end portion of said barge for removing the lighter of the two liquids from the surface of the heavier liquid, said skimmer apparatus comprising a dam having an upper edge with a transversely curved surface, means for adjusting the vertical portion of said edge, the apex of said upper edge being adapted to be immersed to a depth determined by the thickness of the layer of lighter density liquid, a reservoir having a downwardly directed outlet, a downwardly sloping spillway connecting said dam and reservoir, a suction pump connected to said outlet for removing and maintaining the flow of liquid down the spillway, diffusion means mounted within said hull below said flotation tanks for reducing the velocity of flow, said diffusion box being in open communication with said oil-holding chamber and said water-holding sections and discharge means connected between said pump and diffusion means.

4. A barge assembly of a type described for use in water, comprising a hull providing an inner space, said hull having bottom-openings for said inner space, said hull having an end, a skimmer apparatus carried by said hull at said hull end, said skimmer apparatus comprising a weir substantially in the face of said hull end, adjustable means for adjusting the top of said weir with respect to the water surface, said skimmer apparatus comprising a sump having a bottom side extending downwardly from said weir, discharge means for said sump at the lower portion of said sump, a suction pump carried by said barge assembly and having an inlet and an outlet, connection means connecting said discharge-means to said pump-inlet, and outlet connection means connecting said pump-discharge to said inner space.

5. A barge assembly of a type described for use in water, comprising a hull providing an inner space, said hull having bottom-openings for said inner space, said hull having an end provided with an indentation portion, a skimmer apparatus in said indentation portion, said skimmer apparatus comprising a weir, said weir being substantially in the face of said hull end, means for adjusting the vertical position of the upper edge of said weir with respect to the water surface, said skimmer apparatus comprising a sump having a bottom side extending downwardly from said weir, discharge means for said sump comprising a downwardly directed pipe means at the lower portion of said sump, a suction pump carried by said barge assembly and having an inlet and an outlet, con- 6. A barge assembly of a type described for use in water, comprising a hull providing an inner settling container space, said hull having bottom-openings for said inner container space, said hull having a stern end, a skimmer apparatus having a sump rigidly carried by said hull at said stern end and extending forwardly of said stern end, said skimmer apparatus comprising a solid weir extending across said sump, adjustable means for adjusting the top of said weir with respect to the water surface, said skimmer apparatus comprising a sump having a bottom side extending downwardly from said weir, discharge means for said sump comprising a downwardly directed pipe means at the lower portion of said sump, a suction pump carried by said barge assembly and having an inlet and an outlet, connection means connecting said pipe-means to said pump-inlet, and outlet connection means connecting said pump-discharge to said inner space.

7. A barge assembly of a type described for use in water, comprising a hull providing an inner space, said hull having bottom-openings for said inner space, said hull having an end provided with an indentation portion, a skimmer apparatus in said indentation portion, said skimmer apparatus comprising a weir, means for adjusting the vertical position of the upper edge of said weir with respect to the water surface, said skimmer apparatus comprising a sump having a bottom side extending downwardly from said weir, discharge means for said sump comprising a downwardly directed pipe means at the lower portion of said sump, a suction pump carried by said barge assembly and having an inlet and an outlet, connection means connecting said pipe-means to said pump-inlet, and outlet connection means connecting said pump-discharge to said inner space.

8. A barge assembly as defined in claim 6 but further characterized by said outlet connection means comprising a walled diffusion box including a plurality of outlet ports in its walls.

9. A barge assembly as defined in claim 7 but further characterized by said outlet connection means comprising a walled diffusion box including a plurality of outlet ports in its walls.

10. A barge of a type described comprising a hull having a deck and spaced vertical sides, a pair of spaced bulkheads between said sides and extending downward from said deck, closure means including horizontal platings cooperating with said bulkheads and said sides to form flotation chambers in the upper part of said hull along the sides thereof and to form an oil-collecting chamber centrally between said bulkheads, said bulkheads having portions extending below said platings to provide a plurality of water-receiving spaces in said hull extending substantially across the bottom of said hull below said flotation chambers and oil-collecting chamber, said lower portions of said bulkheads having openings therein to provide open communication between said spaces and said oil-collecting chamber.

11. A barge of a type described comprising a hull having a deck and spaced sides, a pair of spaced bulkheads between said sides and extending downward from said deck, closure means including platings from said bulkheads to said sides to form flotation chambers in the upper part of said hull along the sides thereof and to form an oil-collecting chamber centrally between said bulkheads, said platings providing a water-receiving space in said hull extending substantially across the bottom of said hull below said flotation chambers and oil-collecting chamber, said space being in open communication with said oil-collecting chamber, a walled diffusion box at the bottom of said oil-collecting chamber, said diffusion box having an inlet, pump means having a discharge connected to said diffusion box inlet adapted to supply said diffusion box with a mixture of oil and water, the walls of said diffusion box having a plurality of open ports.

12. An oil-skimmer barge comprising a hull having a deck, spaced sides, and an end side joined to said spaced sides, said end side comprising an indentation portion extending above and below the waterline of the hull, an oil skimmer in said indentation, said oil skimmer comprising a weir and a sump, said weir having an upper overflow edge, said sump comprising a downwardly directed apron extending inwardly of said hull from said weir to an outlet, an outlet pipe extending downwardly from said outlet, a suction pump having a pump inlet connected to said outlet pipe, means for adjusting the position of said overflow edge with respect to said waterline, bulkhead and plate means inside said hull co-operating with said sides to form an upper flotation chamber, an upper central oil-collecting chamber and a lower water-receiving chamber, the last said chamber being open to said oil-collecting chamber and to water about the large, and connection means connecting the discharge of said discharge pump to said water-receiving chamber space.

13. An oil-skimmer barge as defined in claim 12 but further characterized by said adjusting means for said weir edge comprising means for raising and lowering said edge with respect to said indentation portion.

14. An oil-skimmer barge as defined in claim 10 but further characterized by said adjusting means for said weir edge comprising movable weight means on said deck.

15. A skimmer apparatus of a type described comprising a sump, an edge of said sump having a relatively long side comprising a weir, means for adjusting the position of the top edge of said weir, said sump comprising an apron having edges convergingly extending from said weir to provide a relatively short side opposite said long side, said apron sloping downwardly from said weir toward the bottom of said sump to form a spillway with downwardly converging sides, a plurality of vertical walls forming the remaining walls of said sump, a discharge extending downwardly from the bottom of said sump, a diffusion compartment, a suction pump having an inlet and outlet, means connecting said inlet to said discharge, and means connecting said outlet to said diffusion compartment.

References Cited in the file of this patent

UNITED STATES PATENTS

| Number | Name | Date |
|---|---|---|
| 39,169 | Peck et al. | July 7, 1863 |
| 61,880 | Serrell | Feb. 5, 1867 |
| 819,896 | Lefebvre | May 8, 1906 |
| 1,407,936 | Crosby | Feb. 28, 1922 |
| 1,630,078 | Haynes | Mar. 17, 1925 |
| 1,591,024 | Dodge | July 6, 1926 |
| 2,330,508 | McColl | Sept. 28, 1943 |
| 2,391,926 | Scott | Jan. 1, 1946 |
| 2,497,177 | McClintock et al. | Feb. 14, 1950 |
| 2,597,288 | Caldwell | May 20, 1952 |
| 2,633,989 | Kelly et al. | Apr. 7, 1953 |
| 2,661,094 | Stewart | Dec. 1, 1953 |
| 2,670,848 | Van Houten et al. | Mar. 2, 1954 |

FOREIGN PATENTS

| 116,622 | Great Britain | June 20, 1918 |
|---|---|---|

OTHER REFERENCES

Budocks Technical Digest No. 35, June 1953, pages 3, 4 and 5, printed by the U. S. Government Printing Office, Washington, D. C.